United States Patent
Ogale et al.

(10) Patent No.: US 9,057,618 B1
(45) Date of Patent: *Jun. 16, 2015

(54) SYSTEM AND METHOD OF DETERMINING MAP COORDINATES FROM IMAGES

(71) Applicant: Google Inc., Mountain View, CA (US)

(72) Inventors: Abhijit S. Ogale, Mountain View, CA (US); Stephane Lafon, Sunnyvale, CA (US); Andrea Frome, Berkeley, CA (US)

(73) Assignee: Google Inc., Mountain View, CA (US)

(*) Notice: Subject to any disclaimer, the term of this patent is extended or adjusted under 35 U.S.C. 154(b) by 85 days.

This patent is subject to a terminal disclaimer.

(21) Appl. No.: 14/034,746

(22) Filed: Sep. 24, 2013

Related U.S. Application Data (63) Continuation of application No. 13/157,831, filed on Jun. 10, 2011, now Pat. No. 8,577,604.

(60) Provisional application No. 61/362,195, filed on Jul. 7, 2010.

(51) Int. Cl.
  *G01C 21/32* (2006.01)
  *G01C 21/26* (2006.01)
  *G01C 21/34* (2006.01)
  *G01C 21/36* (2006.01)

(52) U.S. Cl.
  CPC .......... *G01C 21/34* (2013.01); *G01C 21/3602* (2013.01); *G01C 21/3476* (2013.01); *G01C 21/32* (2013.01); *G01C 21/26* (2013.01)

(58) Field of Classification Search
  CPC .... G01C 21/26; G01C 21/32; G01C 21/3602; G01C 21/3476; G06K 9/00664
  USPC .......................................................... 701/450
  See application file for complete search history.

(56) References Cited

U.S. PATENT DOCUMENTS

| | | | |
|---|---|---|---|
| 2007/0140595 A1* | 6/2007 | Taylor et al. | 382/310 |
| 2009/0153549 A1* | 6/2009 | Lynch et al. | 345/419 |
| 2010/0166256 A1 | 7/2010 | Kmiecik et al. | |

* cited by examiner

*Primary Examiner* — Tuan C. To
*Assistant Examiner* — Isaac Smith
(74) *Attorney, Agent, or Firm* — Lerner, David, Littenberg, Krumholz & Mentlik, LLP (57) ABSTRACT

Systems and methods provide approximations of latitude and longitude coordinates of objects, for example a business, in street level images. The images may be collected by a camera. An image of a business is collected along with GPS coordinates and direction of the camera. Depth maps of the images may be generated, for example, based on laser depth detection or displacement of the business between two images caused by a change in the position of the camera. After identifying a business in one or more images, the distance from the camera to a point or area relative to the business in the one or more images may be determined based on the depth maps. Using this distance and the direction of the camera which collected the one or more images and GPS coordinates of the camera, the approximate GPS coordinates of the business may be determined.

20 Claims, 7 Drawing Sheets

SYSTEM AND METHOD OF DETERMINING MAP COORDINATES FROM IMAGES

CROSS-REFERENCE TO RELATED APPLICATIONS

This application is a continuation of U.S. patent application Ser. No. 13/157,831 filed Jun. 10, 2011, which claims the benefit of the filing date of U.S. Provisional Patent Application No. 61/362,195 filed Jul. 7, 2010, the disclosures of which are hereby incorporated herein by reference.

BACKGROUND

Services such as Google Maps are capable of displaying street level images of geographic locations. These images, identified in Google Maps as "Street Views", typically comprise photographs of buildings and other features and allow a user to view a geographic location from a person's perspective as compared to a top-down map perspective.

These services may also employ various techniques to identify businesses located in the street level images. For example, human operators may identify businesses, images may be scanned using OCR in order to identify businesses or building numbers, or by matching images of known businesses, such as real estate images, to the street level images. These efforts have been used to map a point of interest ("POI") to a street level image of the POI. The mapping links the POI to an image which is associated with a particular yaw, pitch, and ZOOM.

These services may also provide turn by turn directions to the POI. These systems include handheld GPS devices or mobile phones, vehicle-mounted devices, or Internet-based computers with access to websites such as Google Maps. Users input one or more locations and receive a route and turn-by-turn directions based on the order of inputted locations. The user may follow the turn-by-turn directions to reach the one or more locations.

However, many of the map locations of the points of interest may actually be significantly inaccurate. The location information for a particular POI may be based on user input or information from third parties or may be approximated based on the distance along a roadway. For example, if the service knows that a particular city block contains 5 addresses, the service may approximate the location of these addresses based on the length of the city block. In that regard, a user may identify an address of interest, but the map service may return a location dozens of meters away from the actual location of the address.

BRIEF SUMMARY

Aspects of the disclosure relate generally to identifying the map location of an object in an image. More specifically, the relationship between the location of a portal to a business and the location of the portal determined from the image may be used to increase the accuracy of map information.

One aspect of the disclosure provides a method of determining a geographic location of a portal from a plurality of images. The method includes accessing, by a processor, the plurality of images. Each image of the plurality is associated with geographic location information and direction information identifying a view point of a camera that captured the image. The method also includes identifying the portal in one or more of the plurality of images, wherein the portal is associated with a point of interest. The method also includes selecting an image of the one or more images having the portal therein, accessing surface depth data identifying one or more distances from the geographic location of the camera that captured the selected image to objects of the selected image; determining a distance from the camera that captured the selected image to the portal in the selected image based on the surface depth data; and determining an approximate geographic location of the portal based on the determined distance and the geographic location information and direction information associated with the selected image.

In one example, the approximate geographic location information is latitude and longitude coordinates. In another example, the method also includes selecting a second image of the one or more images having the portal therein; determining a second approximate geographic location of the portal; and determining a third approximate geographic location of the portal based on the second approximate geographic location and the approximate geographic location. In another example, the method also includes determining an approximate geographic location of a second point of interest proximate to the point of interest based on the third approximate geographic location. In another example, the method also includes receiving, from a client device, a request for turn by turn directions, the request including a first location and a destination location; determining whether the destination location corresponds to the point of interest associated with the portal; generating a set of turn by turn directions based on the third geographic location; and transmitting the turn by turn directions to the client device. In another example, the portal includes an entry to a building and provides access to the point of interest. In another example, the portal includes text on a building. In another example, the portal includes a logo on a building.

Another aspect of the disclosure provides a device for determining a geographic location of a portal from a plurality of images. The device includes memory storing the plurality of images. Each of the plurality of images is associated with geographic location information and direction information identifying a view point of a camera that captured the image. The device also includes a processor coupled to the memory. The processor is operable to identify the portal in one or more of the plurality of images, wherein the portal is associated with a point of interest; select an image of the one or more images having the portal therein; access surface depth data identifying one or more distances from the geographic location of the camera that captured the selected image to objects of the selected image; determine a distance from the camera that captured the selected image to the portal in the selected image based on the surface depth data; and determine an approximate geographic location of the portal based on the determined distance and the geographic location information and direction information associated with the selected image.

In one example, the approximate geographic location information is latitude and longitude coordinates. In another example, the processor is also operable to select a second image of the one or more images having the portal therein; determine a second approximate geographic location of the portal; and determine a third approximate geographic location of the portal based on the second approximate geographic location and the approximate geographic location. In another example, the processor is also operable to determine an approximate geographic location of a second point of interest proximate to the point of interest based on the third approximate geographic location. In another example, the processor is also operable to receive, from a client device, a request for turn by turn directions, the request including a first location and a destination location; determine whether the destination location corresponds to the point of interest associated with the portal; generate a set of turn by turn directions based on the third geographic location; and transmit the turn by turn directions to the client device.

Yet another aspect of the disclosure provides a tangible computer-readable storage medium on which computer readable instructions of a program are stored. The instructions, when executed by a processor, cause the processor to perform a method of determining a geographic location of a portal from a plurality of images. The method includes accessing, by a processor, the plurality of images. Each image of the plurality is associated with geographic location information and direction information identifying a view point of a camera that captured the image. The method also includes identifying the portal in one or more of the plurality of images, wherein the portal is associated with a point of interest and provides access to the point of interest; selecting an image of the one or more images having the portal therein; accessing surface depth data identifying one or more distances from the geographic location of the camera that captured the selected image to objects of associated with the selected image; determining a distance from the camera that captured the selected image to the portal in the selected image based on the surface depth data; and determining an approximate geographic location of the portal based on the determined distance and the geographic location information and direction information associated with the selected image.

In one example, the approximate geographic location information is latitude and longitude coordinates. In another example, the method also includes selecting a second image of the one or more images having the portal therein; determining a second approximate geographic location of the portal; and determining a third approximate geographic location of the portal based on the second approximate geographic location and the approximate geographic location. In another example, the method also includes determining an approximate geographic location of a second point of interest proximate to the point of interest based on the third approximate geographic location. In another example, the method also includes receiving, from a client device, a request for turn by turn directions, the request including a first location and a destination location; determining whether the destination location corresponds to the point of interest associated with the portal; generating a set of turn by turn directions based on the third geographic location; and transmitting the turn by turn directions to the client device. In another example, the portal includes a building number of a building. In another example, the portal includes text on a building.

DETAILED DESCRIPTION

Figure 1:
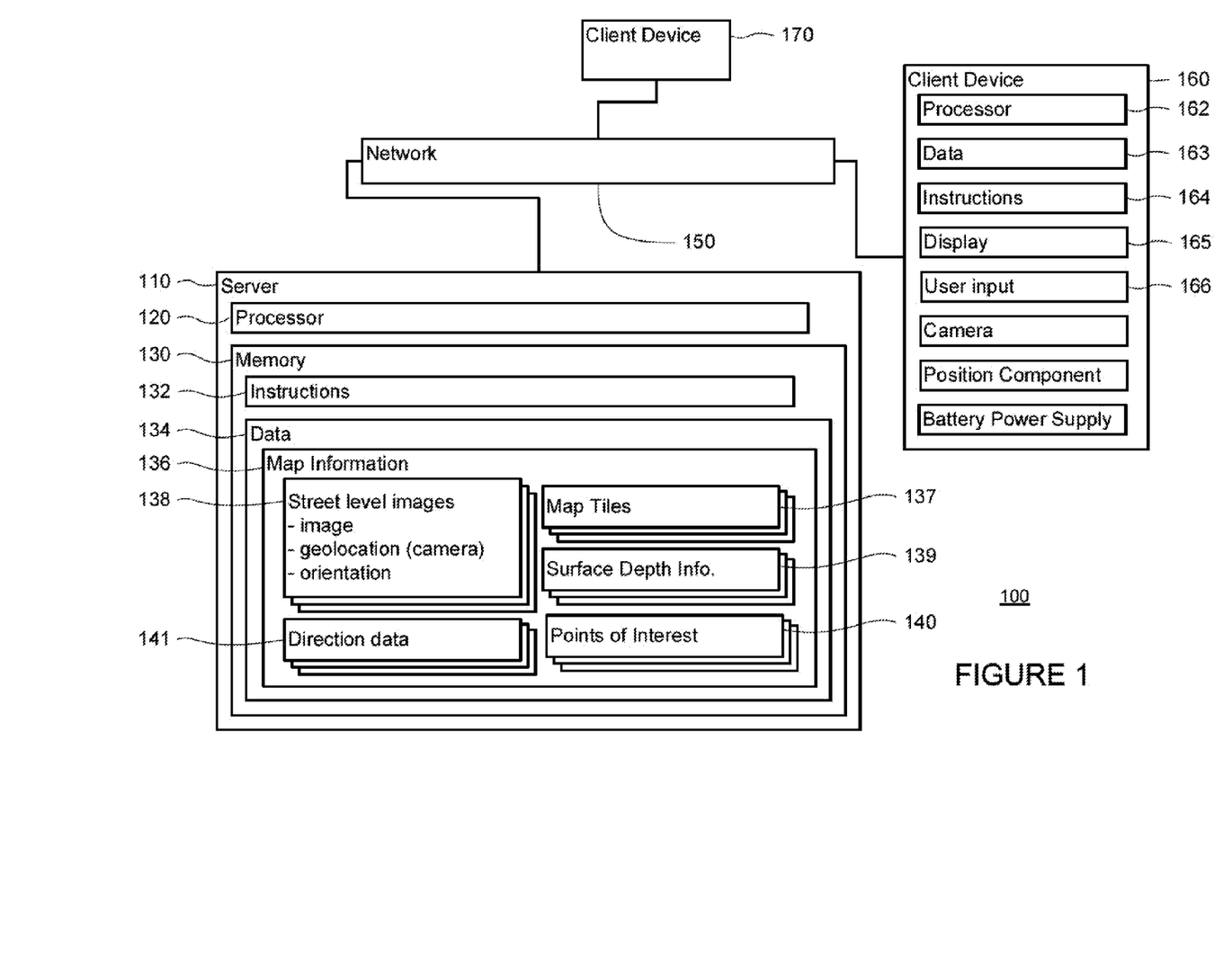
FIG. 1 is a functional diagram of a system in accordance with an exemplary embodiment.
Figure 2:
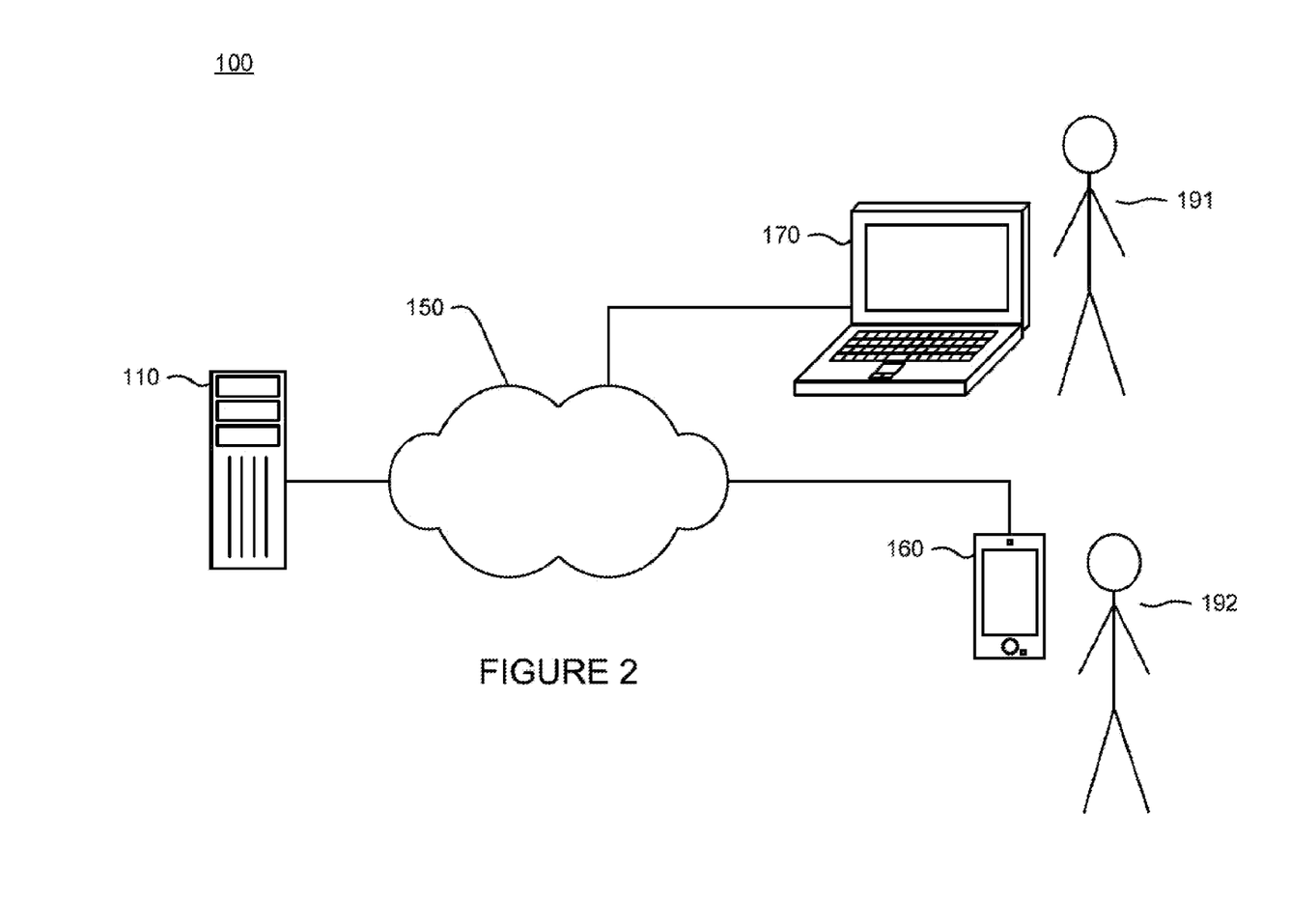
FIG. 2 is a pictorial diagram of a system in accordance with an exemplary embodiment.

As shown in FIGS. 1-2, a system 100 in accordance with one aspect of the disclosure includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly communicating with other nodes of the network. For example, computer 110 may comprise a web server that is capable of communicating with client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by any device capable of transmitting data to and from other computers, such as modems (e.g., dial-up, cable or fiber optic) and wireless interfaces. Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera, position component, accelerometer, speakers, a network interface device, a battery power supply, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a PDA-type phone), a keypad (in the case of a typical cellular phone) or a touch screen (in the case of a PDA).

Map data 136 of server 110 stores map-related information, at least a portion of which may be transmitted to a client device. For example, the map data may store map tiles 137, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

Figure 3:
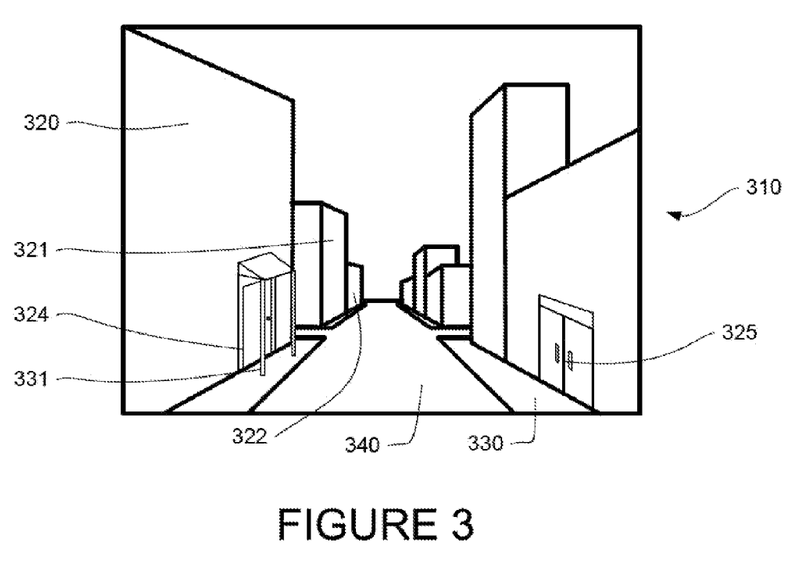
FIG. 3 is a street level image in accordance with exemplary embodiment.

The map information may also include street level images 138. Street level images comprise images of objects at geographic locations, captured by cameras at geographic locations, in a direction generally parallel to the ground or while the camera is tilted and rotated at various angles. Thus, as shown in FIG. 3, street level image data may represent various geographic objects such as buildings 320-22, building portals 324-325, sidewalks 330-31, and street 340 from a perspective of a few feet above the ground and looking down the street. Building portals, for example, may include entrances and exits to a building which provide access to a particular POI. It will be understood that while street level image 310 only shows a few objects for ease of explanation, a typical street level image will contain as many objects asocial with geographic locations (street lights, mountains, trees, bodies of water, vehicles, people, etc.) in as much detail as the camera was able to capture.

In one example, the street level image may be captured by a camera mounted on top of a vehicle, from a camera angle pointing roughly parallel to the ground and from a camera position at or below the legal limit for vehicle heights (e.g., 7-14 feet). Street level images are not limited to any particular height above or orientation relative to the ground, for example, a street level image may be taken from the top of building. Panoramic street-level images may be created by stitching together a plurality of photographs taken from different camera angles.

Figure 4:
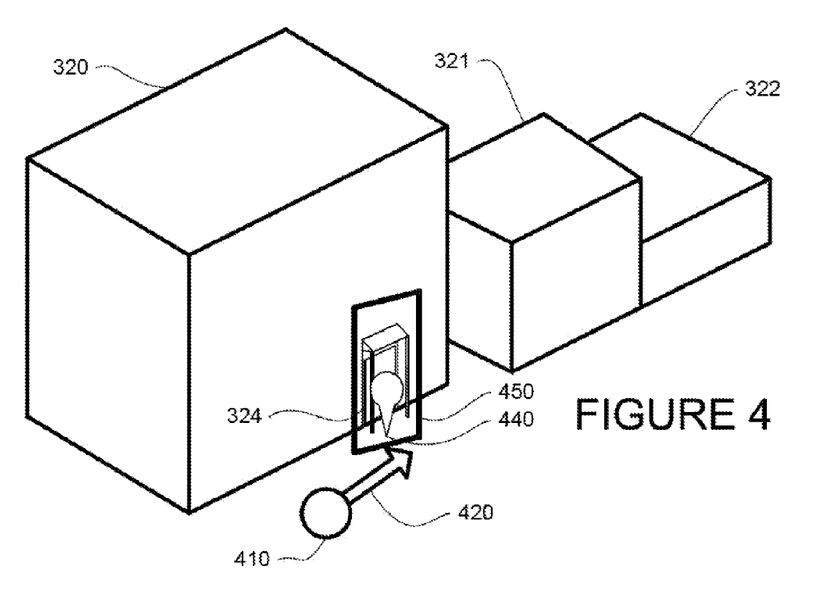
FIG. 4 is a street level image in accordance with exemplary embodiment.

Each street level image may be associated with data describing the location of the camera when the image was captured. For example, the image of FIG. 3 may be associated with GPS latitude and longitude coordinates as well as the angle of the camera which captured the image. FIG. 4 pictorially illustrates the locations of the buildings 320-21 relative to the position 410 and angle 420 of the camera when the image of FIG. 3 was captured.

Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images 138 are typically associated with information indicating the orientation and zoom of the camera which captured the image. For example, if the street level image comprises a typical photograph, the orientation may simply be the camera angle, which in turn may be represented as an angle that is 30° East of true North and rises 2° from ground level. If the street level images are panoramic images, such as 360° panoramas centered at the geographic location associated with the image, the orientation may indicate the portion of the image corresponding with looking due North from the camera position at an angle directly parallel to the ground. In another example, the orientation of camera may be described in terms of its roll, pitch and yaw which may be associated with the image.

Figure 5:
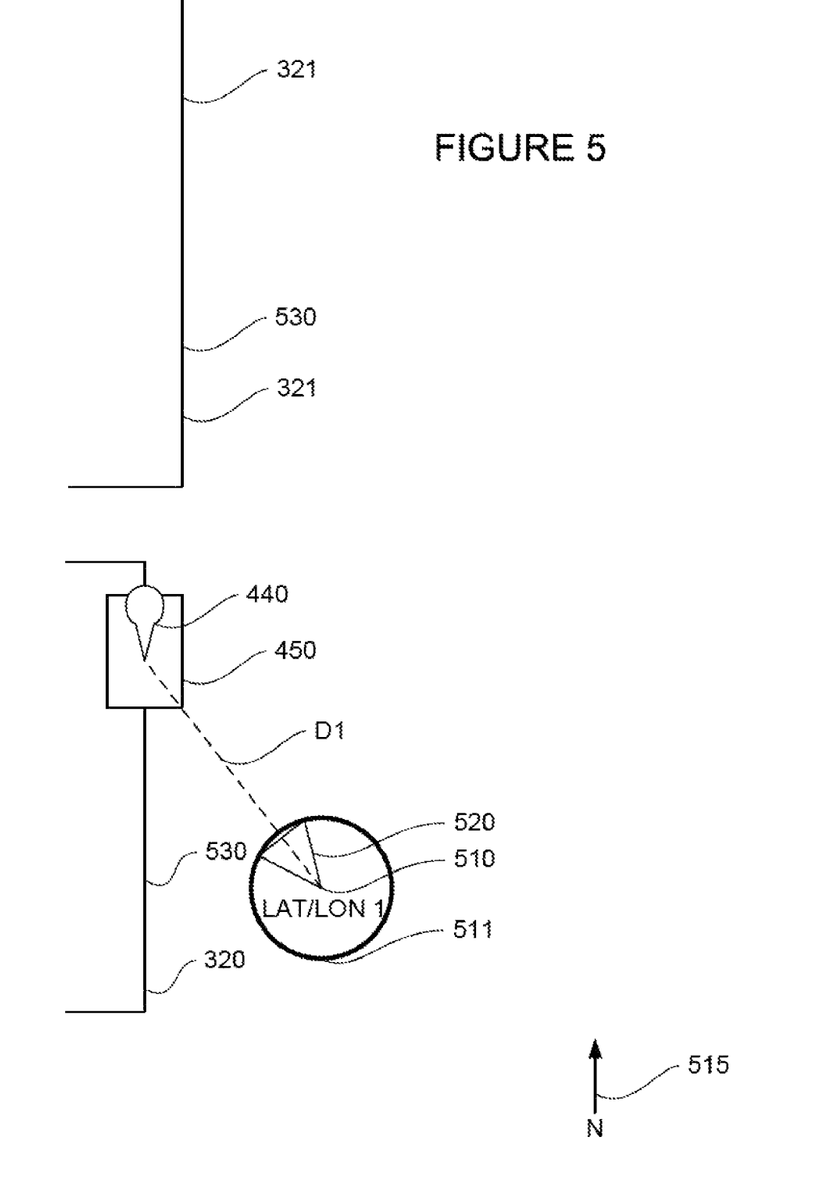
FIG. 5 is a diagram of data in accordance with an exemplary embodiment.

FIG. 5 includes a depiction of various data associated with the street level image of FIG. 3. Position 510 represents the position of a camera when the image of FIG. 3 was captured. The position may actually comprise latitude and longitude coordinates, LAT/LON 1. The accuracy of these coordinates may be represented by the diameter and shape of circle 511. At the time the image was captured, the camera was oriented at an angle 520, for example 30 degrees west of north, as indicated by compass indicator 515.

Other formats for storing the object position data may also be used. For example, rather than being associated with absolute values such as latitude/longitude, the values may be relative and in any scale. Moreover, even if a first type of information is used (such as storing the latitude, longitude and altitude of the camera and surface), information of another type may be generated from it (such as using differences between latitude/longitude positions and altitudes to calculate distances).

Returning to FIG. 1, map information 136 may also include surface depth information 139 which describes the physical distances from the camera to the surfaces in an image. For example, a particular street level image may be mapped in order to identify the distance from the camera to the object of each pixel of the image. A variety of systems and methods may be used to collect the surface depth information. By way of example only, a laser rangefinder may be used. In addition, stereoscopic systems employing two cameras, spaced slightly apart yet looking at the same scene, may be used as well; by analyzing the slight differences between the images seen by each camera, it is possible to estimate the distance at each point in the images. In yet another aspect, the information may be compiled by using a single video camera, travelling at a particular velocity, to capture the street level imagery as the scenery passes by. The video may not only be used as the street level image, but subsequent frames may be compared to extract the different distances between the objects and the camera (e.g., mountains in the distance will stay in the frame much longer than a fire hydrant passing by along the street).

The lines 530 may represent the surface depth information of buildings 320-322 captured, for example, by lasers or other measurements. In some examples, the surface depth information may be less reliable, for example where the portal is partially occluded by a tree or other object, where the laser rangefinder receives poor reflections off of a glass surface, or in the case of stereo-based methods, where the surface has no texture, such as a plain white wall. Thus the surface depth may be estimated to a fixed depth of a few meters, for example 10 meters or less.

Map information 136 may also include POI 140 such as businesses, individuals' homes, landmarks, roads, bodies of land or water, items located in a store, items that can be moved to different locations etc. The POIs may be associated with geographic location information such as street addresses or latitude and longitude coordinates. It will be understood that while many of the examples below refer to businesses, most aspects of the system and method are not limited to any particular type of POI.

The system may also include direction data 141 for generating turn-by-turn directions based on a plurality of route segments. Turn-by-turn directions may include text instructions, audio instructions, and maps. Each turn-by-turn direction and associated route segment may be further associated with one or more map tiles such that each turn-by-turn direction displayed with the one or more map tiles. It will be understood that turn-by-turn directions are not limited to instructions to make simple turns, for example, other directions may include continuing on a road, taking a particular exit, etc.

In addition to the operations described below and illustrated in the figures, various operations will now be described. It should also be understood that the following operations do not have to be performed in the precise order described below. Rather, various steps can be handled in a different order or simultaneously.

A portal of a building may be identified. The portal may include, for example, a business's entry or exit, text or a business name, a building number, a business or other logo, or other identifying feature. Returning to FIGS. 3 and 4, portal 324 represents an entry or an exit associated with building 320. In one example, the portal may be an entry and/or exit to a particular business located at 115 Main Street. The locations of these portals in one or more street level images may be determined in a variety of ways. For example, the portals of a particular street level image may be identified manually by human operators, by scanning the image using special optical character recognition (OCR) algorithms to recognize a business's entry or exit, name, number, or logo from an image, or by taking a known image of a business and matching it to a street level image.

Once a portal has been identified, the result is a viewcode which associates the portal (and the address of the portal's associated POI) to a viewpoint (pitch, yaw, roll, zoom) of the camera which captured the image. For example, as shown in FIG. 4, the viewcode may be represented by a marker 440 or bounding box 450 proximate to the identified portal in the street level image of the portal. These objects may be used to identify the location of an entrance or exit to building 320 and accordingly, the entrance or exit to the business located at 115 Main Street.

Using the position of the marker in the image along with the angle of the camera and the surface depth information, the geographic map location of the marker may be determined. For example, as shown in FIG. 5, based on the location of the viewcode marker 440, a distance D1 may be calculated between the position 510 of the camera and the marker 440. The geographic location coordinates, LAT/LON1, of the camera may be used in conjunction with distance D1, and angle 520 to determine a geocode or an approximate geographic location (the latitude and longitude of marker 440) of an entry and/or exit to the business located at 115 Main Street.

Figure 6:
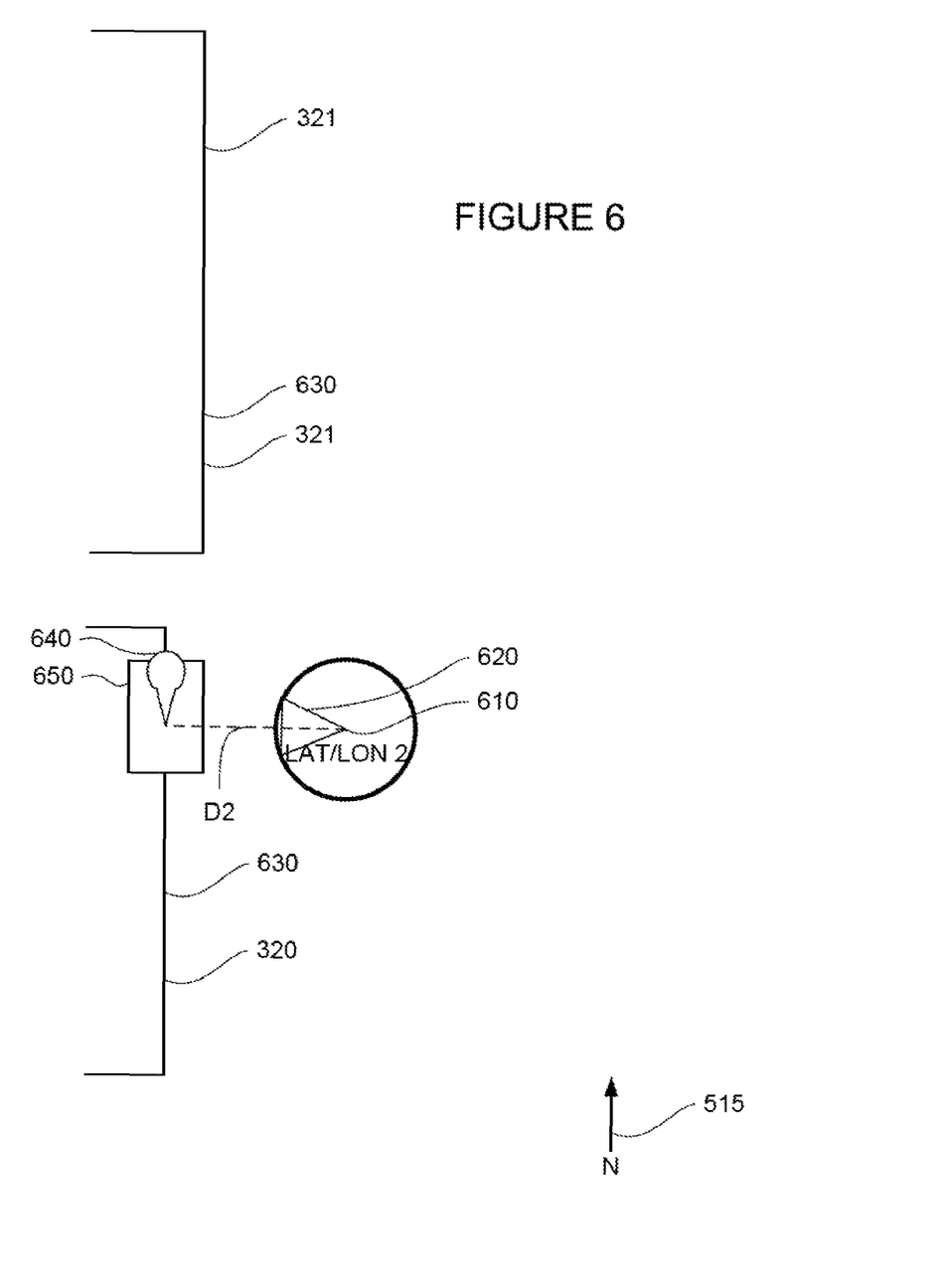
FIG. 6 is a diagram of data in accordance with an exemplary embodiment.

In order to increase the accuracy of the approximation, a similar calculation may be used with a plurality of street level images of the building and the portal. For example, as shown in FIG. 6, a second street level image including building 320 may be associated with a different viewcode including second position 610 of a camera including LAT/LON2 and a different, second angle 620. Again, marker 640 and bounding box 650 represent portal 324 identified in the second street level image. Using surface depth information 630, the distance from position 610 and marker 640, D2, may be determined. Geographic location coordinates, LAT/LON2, distance D2, and angle 620 may be used to approximate a second geographic location of the portal or a second geocode.

As described above, the plurality of images may be used to identify a plurality of geocodes for a particular portal. These locations may be averaged together to greatly increase the accuracy of the approximate geographic location coordinates associated with the portal, and thus the entry and/or exit to a building or business.

Figure 7A:
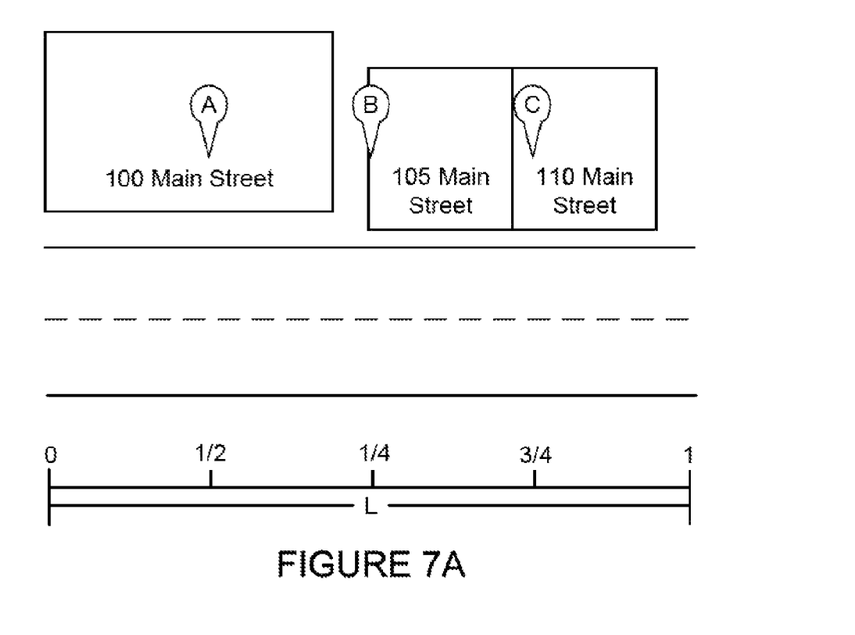
FIGS. 7A and 7B are a diagram of data in accordance with an exemplary embodiment.
Figure 7B:
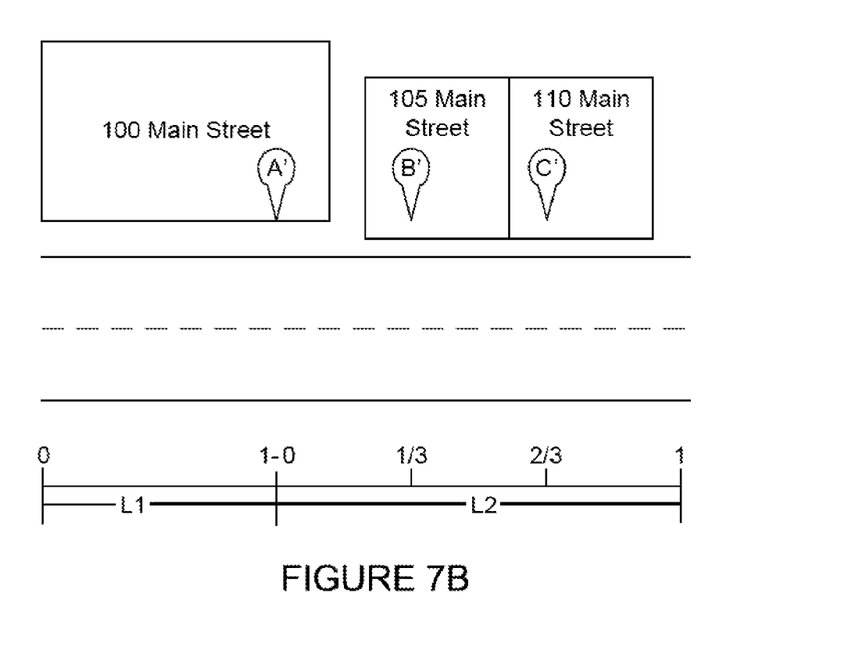

The approximated location of the portal may be used in a variety of ways to improve the use of the map information 136. In one example, determining the location of a particular portal of a business may be used to increase the accuracy of the location information associated with a nearby POI. FIGS. 7A and 7B are one such example. As noted above, the locations of points of interest along a particular city block may be approximated based on the length of the block and the number of known addresses. As shown in FIG. 7A, one system may approximate the locations of the points of interest by spacing markers A (representing 100 Main Street), B (representing 110 Main Street), and C (representing 115 Main Street) at equal distances along a block of length L. As can be seen from the figure, this may result in the locations not actually corresponding to a relevant portion of a building. Some map services may actually locate the marker for an address or point of interest in the middle of a building which again may not actually correspond to a relevant portion of the building. This may be especially significant where a building is located along several roadways and the entry and/or exit is proximate to only one of the several roadways.

Where the location of a portal for a POI has been approximated, the marker associated with the POI may be moved to correspond to the location of the portal. Each geocode provides an additional measurement along a street, and proximate, or neighboring, address locations may be more accurately estimated by interpolating between accurately geocoded addresses. As shown in FIG. 7B, based on the location of portal 324, marker A has been relocated to marker A'. Using the location of marker A', the block may be divided into two lengths L1 and L2. The markers B and C may also be moved to locations of B' and C' such that they are evenly spaced along the respective lengths. As a result of calculating the location of a single portal, the map information associated with many other POIs may be adjusted to increase the accuracy of the map information. The examples of FIGS. 7A and 7B have been simplified for ease of explanation, and it will be understood that much more complicated calculations which may consider any number of factors may be used.

In another example, the location of a portal may be used to provide turn by turn directions to a user. For example, server 110 may receive a request for turn by turn directions from client device 170. The request may include an initial location and a destination location. Rather than simply identifying a point of interest based on the destination location, the server may determine whether the destination location corresponds to a POI associated with an identified portal. If the server identifies a portal, the server may generate the turn by turn directions using the approximate location of the portal. The turn by turn directions may be transmitted to the client device and used by a user to reach the destination location. Thus, the user is directed to an entry and/or exit of the destination location rather than to a location somewhere proximate to the destination location. Again, this may be especially helpful to a user where a building is located along several roadways and the entry and/or exit is proximate to only one of the several roadways. Thus, the user may be directed to the entry of a building as opposed to the roadway location closest to the middle of the building.

Figure 8:
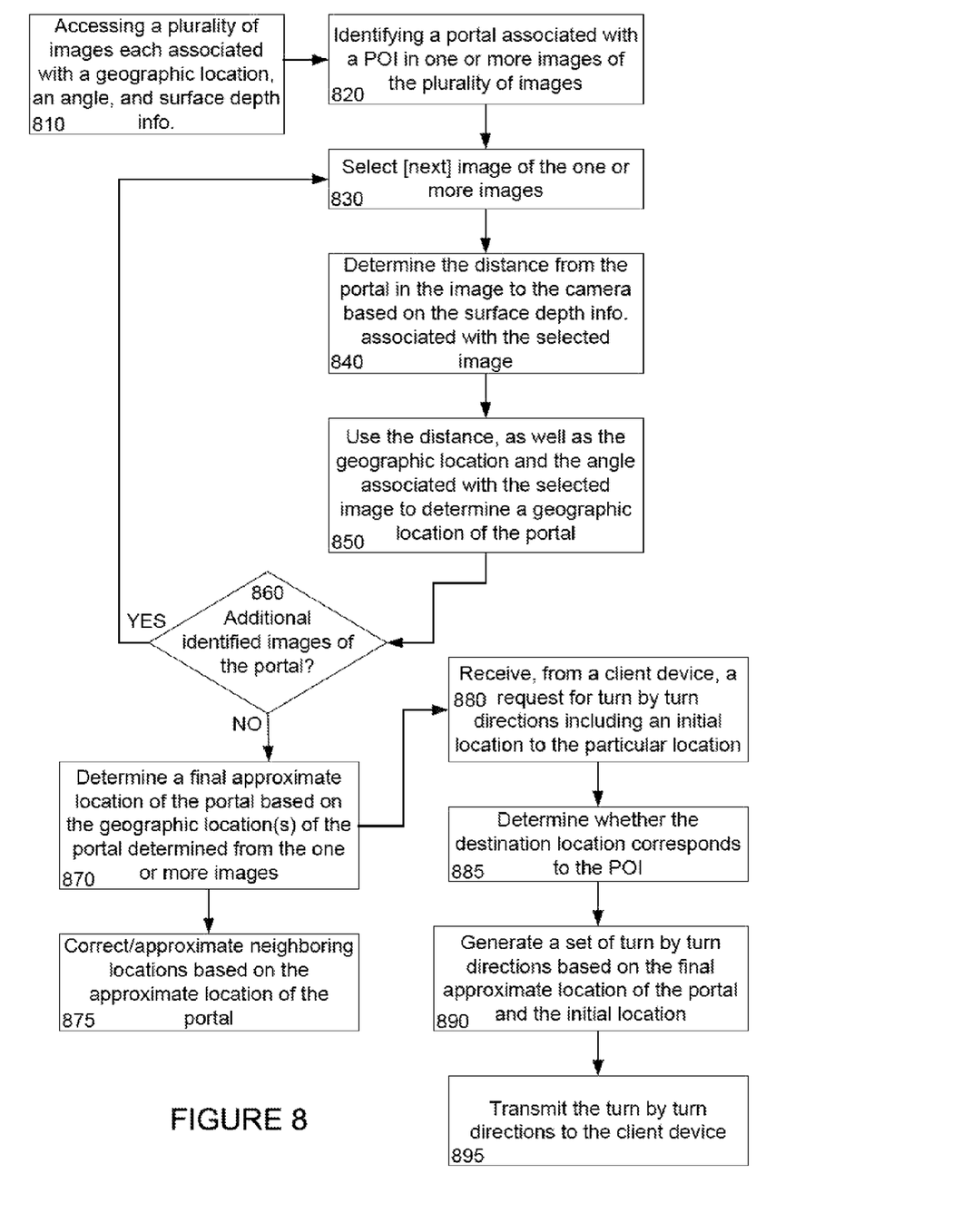
FIG. 8 is a flow diagram in accordance with an exemplary embodiment.

FIG. 8 illustrates an exemplary flow diagram of the processes described above with respect to an exemplary server. As shown in block 810, the server accesses a plurality of images. Each of the images is associated with a geographic location and an angle which describes the position and orientation of the camera when the image was captured as well as surface depth data of the pixels in the image. At block 820, the server identifies a portal associated with a particular POI, for example the entrance to a particular business, in one or more of the images. At block 830, the server selects one image of the one or more identified images and determines the distance from the portal in the selected image to the geographic location of the camera that captured the image based on the surface depth data at block 840. Using the determined distance as well as the geographic location and the angle associated with the selected image, the server determines an approximate geographic location of the portal at block 850. The server then determines whether there are additional images of the portal at block 860. If so, the server will return to block 830 and continue to make calculations regarding the approximate geographic location of the portal as described above. If there are no additional identified images of the portal, the server will use the geographic locations determined at block 850 to identify a final approximate geographic location of the portal at block 870.

In one example, at block 875, the approximate geographic location of the portal may be used to correct or approximate the locations of neighboring points of interest.

In another example, at block 880, a request for turn by turn directions is received from a client device. The request identifies an initial location and a destination location. The server then determines, at block 885, whether the destination location corresponds to the POI of block 820. If so, the server will generate a set of turn by turn directions based on the initial location and the final approximate location of the portal at block 890. The turn by turn directions are then transmitted to the client device at block 895.

As these and other variations and combinations of the features discussed above can be utilized without departing from the subject matter defined by the claims, the foregoing description of exemplary embodiments should be taken by way of illustration rather than by way of limitation of the subject matter defined by the claims. It will also be understood that the provision of the examples disclosed herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
   identifying a portal in an image, wherein the portal is associated with a point of interest identified by a location of a first map marker in map data;
   receiving surface depth data identifying one or more distances from the geographic location of the camera that captured the image to objects of the image;
   determining a distance from the camera that captured the image to the portal in the image based on the surface depth data;
   determining, by one or more computing devices, an approximate geographic location of the portal based on the determined distance and the geographic location information and direction information associated with the image;
   adjusting, by the one or more computing devices, the location of the first map marker in the map data based on the approximate geographic location; and
   adjusting, by the one or more computing devices, the location of a second map marker in the map data based on the adjusted location of the first map marker.

2. The method of claim 1, wherein the first and second map markers are associated with a particular portion of roadway, and adjusting the location of the second map marker includes moving the second map marker relative to the location of the particular portion of roadway.

3. The method of claim 1, wherein the first and second map markers are associated with respective geographic location codes, and adjusting the locations of the first and second map markers further includes changing the respective geographic location codes of the first and second map markers.

4. The method of claim 1, wherein the first and second map markers are both associated with a particular portion of roadway, and adjusting the location of the second map marker includes changing relative spacing between the first and second map markers along the particular portion of roadway.

5. The method of claim 1, further comprising in conjunction with adjusting the second map marker, adjusting a location of a third map marker in the map data based on the adjusted location of the first map marker.

6. The method of claim 5, wherein the first and second map markers are both associated with a particular portion of roadway, and adjusting the location of the second and third map markers includes evenly spacing the first, second, and third map markers along the particular portion of roadway.

7. The method of claim 1, wherein the first and second map markers are both associated with a particular portion of roadway, and adjusting the location of the second map marker includes changing a relative distance between the second map marker and the particular portion of roadway.

8. A system comprising one or more computing devices configured to:
   identify a portal in an image, wherein the portal is associated with a point of interest identified by a location of a first map marker in map data;
   receive surface depth data identifying one or more distances from the geographic location of the camera that captured the image to objects of the image;
   determine a distance from the camera that captured the image to the portal in the image based on the surface depth data;
   determine an approximate geographic location of the portal based on the determined distance and the geographic location information and direction information associated with the image;
   adjust the location of the first map marker in the map data based on the approximate geographic location; and
   adjust the location of a second map marker in the map data based on the adjusted location of the first map marker.

9. The method of claim 8, wherein the first and second map markers are associated with a particular portion of roadway, and the one or more computing devices are further configured to adjust the location of the second map marker by moving the second map marker relative to the location of the particular portion of roadway.

10. The method of claim 8, wherein the first and second map markers are associated with respective geographic location codes, and the one or more computing devices are further configured to adjust the locations of the first and second map markers further by changing the respective geographic location codes of the first and second map markers.

11. The method of claim 8, wherein the first and second map markers are both associated with a particular portion of roadway, and the one or more computing devices are further configured to adjust the location of the second map marker by changing relative spacing between the first and second map makers along the particular portion of roadway.

12. The method of claim 8, further comprising in conjunction with adjusting the second map marker, the one or more computing devices are further configured to adjust a location of a third map marker in the map data based on the adjusted location of the first map marker.

13. The system of claim 12, wherein the first and second map markers are both associated with a particular portion of roadway, and the one or more computing devices are further configured to adjust the location of the second and third map markers by evenly spacing the first, second, and third map markers along the particular portion of roadway.

14. The system of claim 8, wherein the first and second map markers are both associated with a particular portion of roadway, and the one or more computing devices are further configured to adjust the location of the second map marker by changing a relative distance between the second map marker and the particular portion of roadway.

15. A tangible, non-transitory computer-readable recording medium on which computer-readable instructions of a program are stored, the instructions when executed by a processor, cause the processor to perform a method, the method comprising:
   identifying a portal in an image, wherein the portal is associated with a point of interest identified by a location of a first map marker in map data;
   receiving surface depth data identifying one or more distances from the geographic location of the camera that captured the image to objects of the image;
   determining a distance from the camera that captured the image to the portal in the image based on the surface depth data;
   determining, by a processor, an approximate geographic location of the portal based on the determined distance and the geographic location information and direction information associated with the image;
   adjusting, by the processor, the location of the first map marker in the map data based on the approximate geographic location; and
   adjusting the location of a second map marker in the map data based on the adjusted location of the first map marker.

16. The medium of claim 15, wherein the first and second map markers are associated with a particular portion of roadway, and adjusting the location of the second map marker includes moving the second map marker relative to the location of the particular portion of roadway.

17. The medium of claim 15, wherein the first and second map markers are associated with respective geographic location codes, and adjusting the locations of the first and second map markers further includes changing the respective geographic location codes of the first and second map markers.

18. The medium of claim 15, wherein the first and second map markers are both associated with a particular portion of roadway, and adjusting the location of the second map marker includes changing relative spacing between the first and second map markers along the particular portion of roadway.

19. The medium of claim 15, wherein the method further comprises, in conjunction with adjusting the second map marker, adjusting a location of a third map marker in the map data based on the adjusted location of the first map marker.

20. The medium of claim 19, wherein the first and second map markers are both associated with a particular portion of roadway, and adjusting the location of the second and third map markers includes evenly spacing the first, second, and third map markers along the particular portion of roadway.

* * * * *